US012567360B2

(12) United States Patent
Kim et al.

(10) Patent No.: US 12,567,360 B2
(45) Date of Patent: Mar. 3, 2026

(54) DRIVING PACKAGE WITH INTEGRATED DISPLAY AND MANUFACTURING METHOD THEREOF

(71) Applicant: Global Technologies Co., LTD, Hwaseong-si (KR)

(72) Inventors: Min Seon Kim, Hwaseong-si (KR); Yong Geun Kim, Suwon-si (KR)

(73) Assignee: Global Technologies Co., LTD, Hwaseong-si (KR)

( * ) Notice: Subject to any disclaimer, the term of this patent is extended or adjusted under 35 U.S.C. 154(b) by 0 days.

(21) Appl. No.: 18/763,616

(22) Filed: Jul. 3, 2024

(65) Prior Publication Data

US 2025/0054436 A1 Feb. 13, 2025

(30) Foreign Application Priority Data

Aug. 10, 2023 (KR) ........................ 10-2023-0104831

(51) Int. Cl.
*G09G 3/32* (2016.01)
*G09G 3/14* (2006.01)

(52) U.S. Cl.
CPC ................. *G09G 3/32* (2013.01); *G09G 3/14* (2013.01)

(58) Field of Classification Search
CPC ... G09G 3/32; G09G 3/14; H04B 3/54; H04B 1/48; H01L 23/04; H01L 33/62; H01L 27/156; H01L 24/48; H01L 24/24; H01L 25/0753; H10H 20/857; H10H 20/01; H10H 20/856; G06F 3/044; H04N 25/76; H10D 86/60
See application file for complete search history.

(56) References Cited

U.S. PATENT DOCUMENTS

| | | | | |
|---|---|---|---|---|
| 10,622,338 | B2 | 4/2020 | Lim et al. | |
| 11,244,996 | B2 | 2/2022 | Choi et al. | |
| 11,282,820 | B2 | 3/2022 | Takeya et al. | |
| 2014/0008667 | A1* | 1/2014 | Lau | H10D 86/60 257/77 |
| 2017/0229430 | A1* | 8/2017 | Lai | H01L 25/0753 |
| 2017/0294479 | A1* | 10/2017 | Cha | H10H 20/01 |
| 2018/0102805 | A1* | 4/2018 | Ukon | H04B 1/48 |
| 2018/0190615 | A1* | 7/2018 | Pan | G06F 3/044 |
| 2018/0308420 | A1* | 10/2018 | Shin | H04N 25/76 |
| 2018/0337142 | A1* | 11/2018 | Cheng | H01L 23/04 |
| 2019/0013337 | A1* | 1/2019 | Nayak | H01L 27/156 |
| 2019/0267357 | A1* | 8/2019 | Iguchi | H01L 25/0753 |
| 2019/0324577 | A1* | 10/2019 | Pan | H01L 33/62 |

(Continued)

FOREIGN PATENT DOCUMENTS

| | | | |
|---|---|---|---|
| JP | 2023523338 | A | 6/2023 |
| KR | 1020170099324 | A | 8/2017 |
| KR | 1020190026617 | A | 3/2019 |

*Primary Examiner* — Richard J Hong
(74) *Attorney, Agent, or Firm* — WILLIAM PARK AND ASSOCIATES LTD.

(57) ABSTRACT

The present disclosure relates to a driving package with an integrated display and a method thereof for using as a display application or a lighting application and may include a display part configured of a plurality of light emitting devices forming a plurality of pixels so that an entire screen or a portion of the screen can be displayed; and a driving part including the display part on one side and a terminal part on another side, driving the light emitting devices.

5 Claims, 8 Drawing Sheets

(56) References Cited

U.S. PATENT DOCUMENTS

| | | | | |
|---|---|---|---|---|
| 2020/0266180 | A1* | 8/2020 | Pendse | H01L 24/24 |
| 2021/0056892 | A1* | 2/2021 | Wei | H01L 24/48 |
| 2021/0111162 | A1* | 4/2021 | Takeya | H10H 20/857 |
| 2022/0036831 | A1* | 2/2022 | Gray | H04B 3/54 |
| 2022/0302361 | A1* | 9/2022 | Zhao | H01L 33/62 |
| 2023/0246060 | A1* | 8/2023 | Zhang | H10H 20/856<br>438/28 |

* cited by examiner

DRIVING PACKAGE WITH INTEGRATED DISPLAY AND MANUFACTURING METHOD THEREOF

CROSS-REFERENCE TO RELATED APPLICATION(S)

The present application claims priority under 35 U.S.C. § 119 (a) to Korean Patent Application No. 10-2023-0104831, filed on Aug. 10, 2023, in the Korean Intellectual Property Office, the entire contents of which application is incorporated herein by reference.

TECHNICAL FIELD

The present disclosure relates to a driving package with an integrated display and a manufacturing method thereof, and more particularly to the driving package with the integrated display and the manufacturing method thereof configured to be used as a display application or a lighting application.

BACKGROUND

Generally, a conventional display panel had to utilize a large-area glass panel or a large-area backlight panel to form a large screen, so there was a limit to enlargement, and if there was a problem such as defective pixels in some portions, it was difficult to only replace the portions.

Conventionally, in order to solve this problem, techniques for forming unit display panels or unit backlight panels using micro LEDs and connecting them to each other to enlarge the screen have been attempted.

However, the unit panel connecting technique had many problems such as difficulty of connecting each of separate driver ICs or main control units (MCUs) that drives pixels of the display panel or the backlight panel as the number of the connected unit display panels or unit backlight panels increased, thereby complicating wiring or structure or limiting connectivity.

SUMMARY

The present disclosure provides a driving package with an integrated display according to the ideas of the present disclosure to solve the above problems may include a display part comprising a plurality of light emitting devices forming a plurality of pixels so that an entire screen or a portion of the screen can be displayed; and a driving part in which the display part is formed on one side and a terminal part is formed on another side, driving the light emitting devices.

Furthermore, the present disclosure provides a manufacturing method of a driving package with an integrated display may include a step a1 of preparing a wafer for a complementary metal-oxide semiconductor (CMOS) in which a driver IC circuit or a main control unit (MCU) circuit is formed; a step b1 of preparing a wafer for an LED in which a micro LED or an LED is formed; a step c1 of bonding the wafer for CMOS and the wafer for an LED so that a driving part of the wafer for CMOS and a display part of the wafer for an LED can be electrically connected to each other; a step d1 of cutting the wafer for CMOS and the wafer for an LED which are bonded, into a unit package.

Furthermore, the present disclosure provides a manufacturing method of a driving package with an integrated display may include a step a2 of cutting a wafer for a complementary metal-oxide semiconductor (CMOS) in which a driver IC circuit or a main control unit (MCU) circuit is formed, into a semiconductor chip form; a step b2 of cutting a wafer for an LED in which a micro LED or an LED is formed, into an LED chip form; and a step c2 of bonding the semiconductor chip and the LED chip so that the cut semiconductor chip and the cut LED chip can be electrically connected to each other.

According to some embodiment of the present disclosure as described above, a display part and a driving part are integrated into a single package which can be applied to small IT devices such as an AR device or a VR device, or a small projector, and each can be connected in a plurality to each other in a seamless form without a bezel, which allows an easy enlargement of the screen, to apply to a wide range of applications such as a laptop, a monitor, a TV, as well as a large-screen display device, a backlight panel, and a lighting device. However, the scope of the present disclosure is not limited by these effects.

DETAILED DESCRIPTION OF EXEMPLARY EMBODIMENTS

Figure 1:
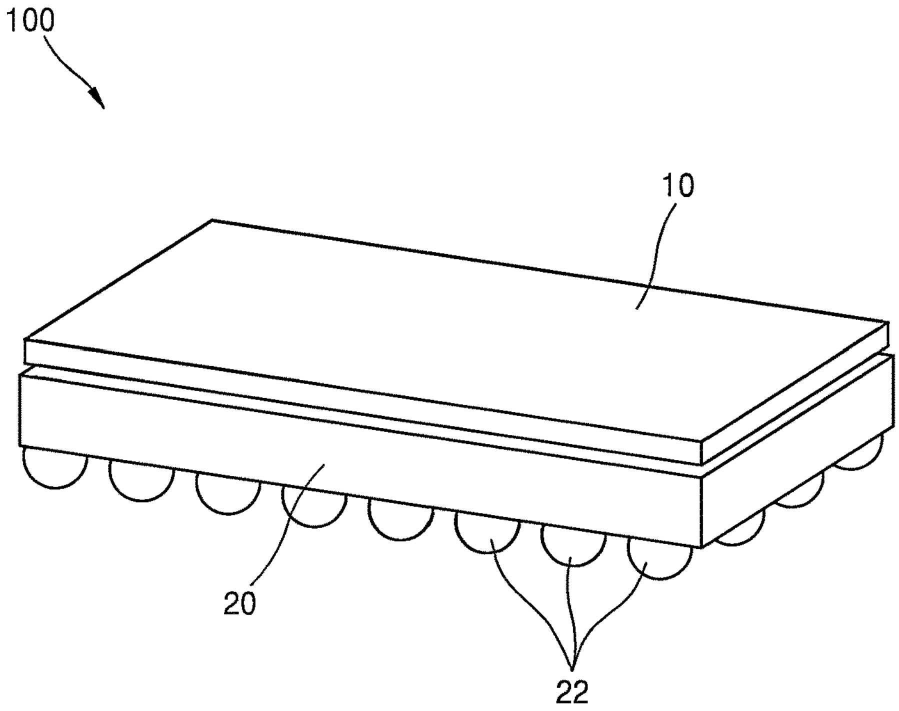
FIG. 1 is an external perspective view of a driving package with an integrated display according to some embodiments of the present disclosure.

Hereinafter, the present disclosure will be described in detail by explaining embodiments of the present disclosure with reference to the attached drawings.

The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. Rather, these embodiments of the disclosure are provided so that this disclosure will be thorough and complete and will convey inventive concepts of the disclosure to those skilled in the art. In the drawings, the thicknesses or sizes of layers are exaggerated for clarity.

It will be understood that when an element, such as a layer, a region, or a substrate, is referred to as being "on," "connected to", "laminated on", or "coupled to" another element, it may be directly on, connected, laminated on, or coupled to the other element or intervening elements may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items It will be understood that, although the terms first, second, etc. may be used herein to describe various members, components, regions, layers, and/or portions, these members, components, regions, layers, and/or portions should not be limited by these terms. These terms are only used to distinguish one member, component, region, layer, and/or portion from another. Thus, a first element, component, region, layer or portion discussed below could be termed a second element, component, region, layer, or portion without departing from the teachings of embodiments.

The present disclosure is for solving a number of problems including the above-described problems and aims to provide a driving package with an integrated display and a manufacturing method thereof in which a display part and a driving part are integrated into a single package which can be applied to small IT devices such as an AR device or a VR device, or a small projector, and each can be connected in a plurality to each other in a seamless form without a bezel, which allows an easy enlargement of the screen, to apply to a wide range of applications such as a laptop, a monitor, a TV, as well as a large-screen display device, a backlight panel, and a lighting device. However, these problems are exemplary and do not limit the scope of the present disclosure.

Figure 2:
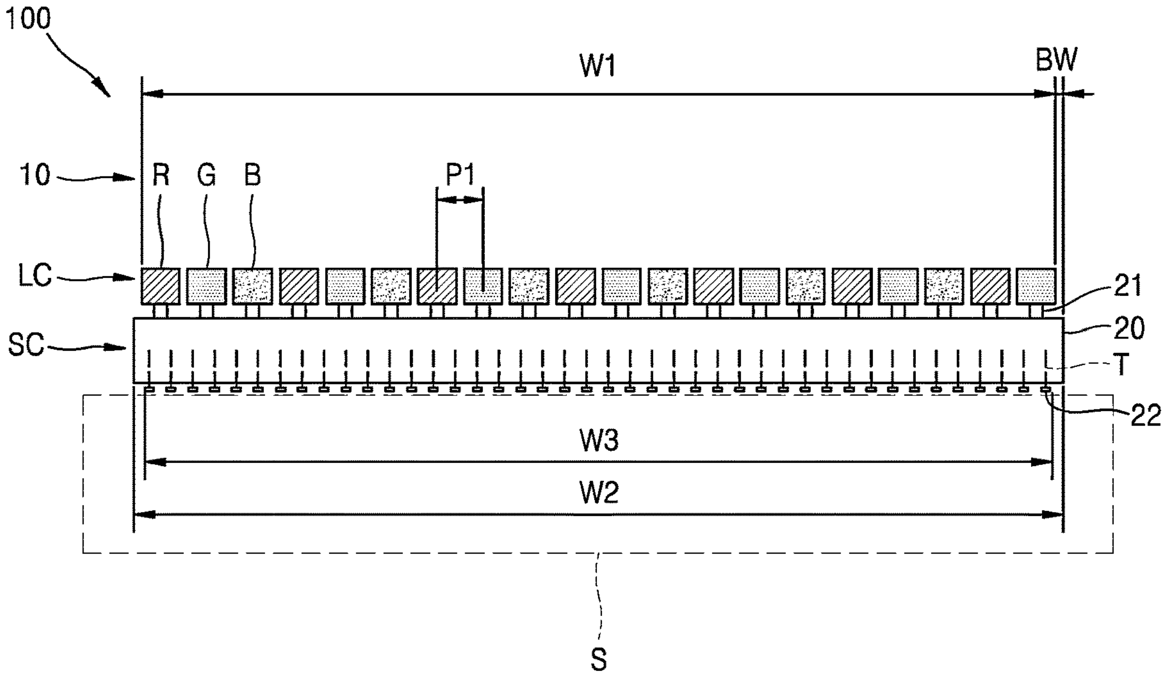
FIG. 2 is a cross-sectional view of the driving package with the integrated display of FIG. 1.
Figure 3:
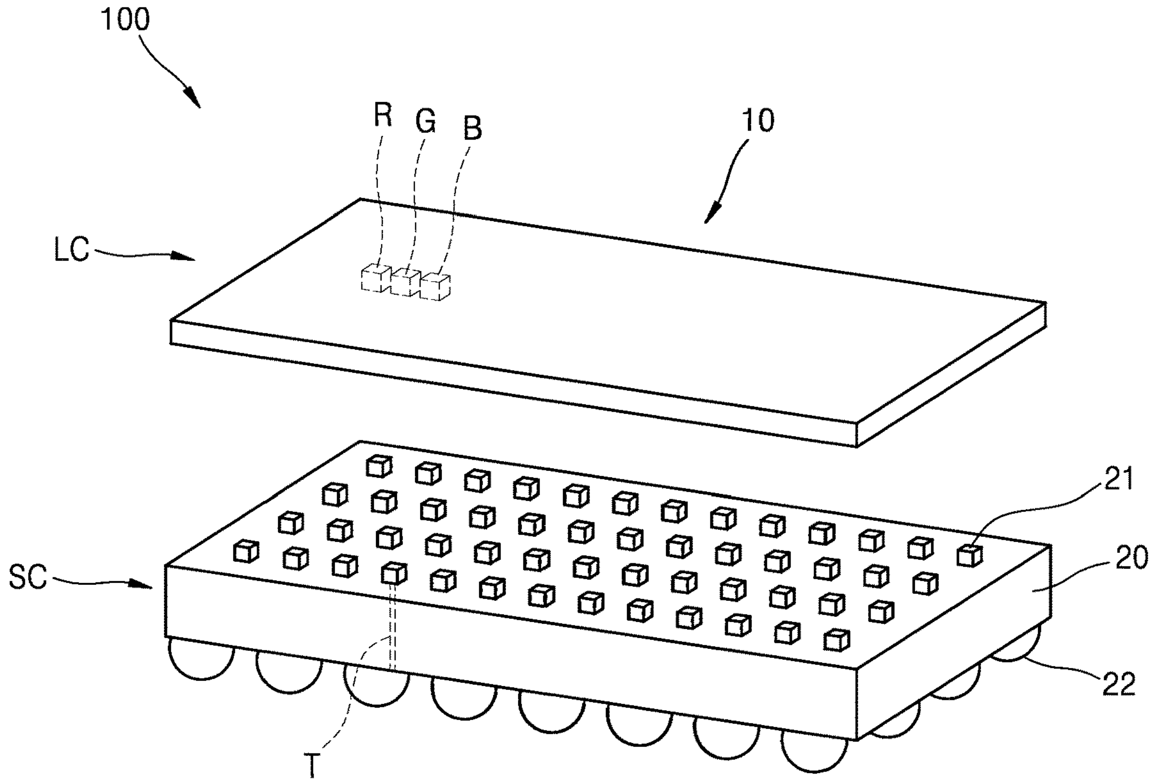
FIG. 3 is an exploded perspective view of components showing the driving package with the integrated display of FIG. 1.

FIG. 1 is an external perspective view of a driving package with an integrated display 100 according to some embodiments of the present disclosure, FIG. 2 is a cross-sectional view of the driving package with the integrated display 100 of FIG. 1, and FIG. 3 is an exploded perspective view of components showing the driving package with the integrated display 100 of FIG. 1.

First, as shown in FIGS. 1 to 3, the driving package with the integrated display 100 according to some embodiments of the present disclosure may include a display part 10 and a driving part 20.

The display part 10 may be a part including a plurality of light emitting devices R, G, and B forming a plurality of pixels so that an entire screen or a portion of the screen can be displayed.

The display part 10 may be, for example, an LED chip LC formed by cutting a wafer for an LED LW (refer to FIG. 6) such as a sapphire substrate, a silicon carbide substrate, a silicon substrate, a germanium substrate, a gallium arsenide substrate, a gallium phosphide substrate, an indium phosphide, a spinel substrate or a gallium nitride substrate on which a micro LED or an LED with a size of 100 micrometers or less is formed, so that mono color or RGB color can be implemented.

The display part 10 may include the plurality of light emitting devices R, G, and B seated on and electrically connected to the driving part 20 to receive driving power from the driving part 20.

In a more specific example, the light emitting devices R, G, and B may include a light emitting diode LED in a form of a flip chip in which a first pad and a second pad are formed on a lower surface, or a protective member (not shown) protecting the light emitting devices R, G, and B.

Here, the light emitting devices R, G, and B are not limited to a red LED, a green LED, or a blue LED. A blue LED or a white LED in the flip chip form may be applied, a non-flip form LED chip in which a pad is formed on an upper surface, or an LED chip which is an inorganic light emitting chip of various colors in the flip chip form may also be applied, and multiple LED chips may be configured together with a driving circuit part which drives the multiple LED chips. These light emitting devices R, G, and B may be any type of LED, such as a general LED, as well as a mini LED or a micro LED.

That is, although not shown, it is possible to apply a light emitting device having a bonding wire applied to the terminals, or a light emitting device having a bonding wire applied partially to a first terminal or a second terminal, or a horizontal type light emitting device, a vertical type light emitting device, and the like, but in order to implement miniaturization and ultra-thinness of the product, the flip chip form may be preferred.

The light emitting device can be configured, for example, by epitaxial growth of a nitride semiconductor such as InN, AlN, InGaN, AlGaN, or InGaAlN on a growth sapphire substrate or a silicon carbide substrate by a vapor phase growth method such as a metal organic chemical vapor deposition (MOCVD) method. Further, the light emitting device may also be formed using semiconductors such as ZnO, ZnS, ZnSe, SiC, GaP, GaAlAs, and AlInGaP in addition to the nitrite semiconductors. These semiconductors may utilize a laminate formed in an order of an n-type semiconductor layer, a light emitting layer, and a p-type semiconductor layer. The light emitting layer (active layer) may utilize a laminated semiconductor having a multi-quantum-well structure, a single quantum-well structure, or a double hetero-structured laminated semiconductor. Furthermore, the light emitting device may be selected to have an arbitrary wavelength depending on its usage, such as a display application or a lighting application.

Here, as a growth substrate, an insulating, conductive, or a semiconductor substrate may be used according to necessity. For example, the growth substrate may be sapphire, SiC, Si, $MgAl_2O_4$, MgO, $LiAlO_2$, $LiGaO_2$, or GaN. For epi growth of a GaN material, a GaN substrate which is a homogeneous substrate can be applied.

Moreover, the protective member may be a light transmitting molding member formed by casting with a light transmitting material including at least silicone or epoxy.

However, the protective member is not limited to the light transmitting molding member, and a light conversion member including a fluorescent material or quantum dots, a color filter member, an optical system, a reflective wall member, and the like may be applied.

Here, the fluorescent material should basically conform to stoichiometry, and each element can be substituted for any other element in each group on the periodic table. For example, Sr can be substituted with Ba, Ca, Mg, etc. of the alkaline-earth group II, Y can be substituted with Tb, Lu, Sc, Gd, etc. of a lanthanide series. Further, an activator such as Eu can be substituted with Ce, Tb, Pr, Er, Yb, etc. depending on a desired energy level, and the activator may be applied alone, or a coactivator, etc., may be additionally applied to change characteristics.

Further, the quantum dots may be nanometer-sized particles that may have optical properties arising from quantum confinement and may include, for example, one or more of the following: a group IV element, a group II-VI compound, a group II-V compound, a group III-VI compound, a group III-V compound, a group IV-VI compound, a group I-III-VI compound, a group II-IV-VI compound, and a group II-IV-V compound.

The quantum dots may be formed by including one or more of ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, and Ge or Si.

Further, the quantum dots may be composed of a core (3 to 10 nm) such as CdSe and InP, and a shell (0.5 to 2 nm) such as ZnS and ZnSe, and a structure of a ligand for stabilization of the core and the shell, and may have an optical property of implementing various colors depending on the size.

Further, the quantum dots may include monomers which can be embedded in a physical structure or other forms and polymerized into a desired physical structure, such as a film.

More specifically, for example, the quantum dots may be injected and cured in a paste form with various binders in addition to a sheet form, formed into other liquid states, or formed into various fluid forms such as a gel or a gel state.

Further, the light conversion member may include two or more phosphor and quantum dot materials having different emission wavelengths, and a mixture of the phosphors and the quantum dot materials may be used.

The driving part 20 may have a display part 10 formed on one side to be integrated with the display part 10 and a terminal part 22 formed on another side to be electrically connected to an external substrate S, and may be a part which drives the light emitting devices R, G, and B.

The driving part 20 may be in a form of a semiconductor chip SC formed by cutting a wafer for a complementary metal-oxide semiconductor (CMOS) SW such as a silicon (Si) substrate, a germanium (Ge) or a gallium arsenide (GaAs) substrate in which a driver IC circuit or a main control unit (MCU) circuit is formed to control the display part 10.

The driving part 20 may have at least one micro bump 21 formed on one surface by methods such as electroless plating or electrolytic plating to be electrically connected to each of the light emitting devices R, G, and B, and at least one through-substrate via (TSV) T may be formed between the micro bump 21 and the terminal part 22.

The driving part 20 includes at least one drive circuit or MCU circuit that functions as the driver IC. The drive circuit may be formed in various forms of circuits to supply power, control drive voltage, process feedback signals, control drive brightness of the light emitting devices R, G, and B, or calibrate light intensity of the light emitting devices R, G, and B to match a reference light intensity of other light emitting devices.

The driving part 20 may include a semiconductor substrate formed by using an integrated circuit process on a semiconductor wafer such as a silicon wafer.

As such, the semiconductor substrate may form a semiconductor material into multiple layers, and electrical connection of the driving circuits formed on each layer may utilize a redistribution layer (RDL).

The driving part 20 may have a plurality of the terminal parts 22 formed on one side of the semiconductor substrate configured to receive power signals or input and output signals for signal input and output of the drive circuit. Such terminal part 22 may be formed of materials with excellent electric conductivity such as Cu, Ni, Ag, and Au and can be applied in forms of various types of solder balls, bumps, or pads.

The terminal part 22 may include at least any one of a ball grid array, a micro pad, or a lead frame to electrically connect to the external substrate S.

Therefore, as shown in FIG. 2, when explaining an operating process of the driving package with the integrated display 100 of the present disclosure, the driving package with the integrated display 100 of the present disclosure may receive the input and output signals from the external substrate S through the terminal part 22 and may input them to the driver IC circuit or the MCU circuit of the driving part 20.

Subsequently, an output power signal from the driver IC circuit or the MCU circuit may be supplied to the light emitting devices R, G, and B through a first pad (not shown) and a second pad (not shown), respectively, and when light is generated by the light emitting devices R, G, and B that has received the output power signal, a light path may be guided by the protective member (not shown) surrounding the light emitting devices R, G, and B, or a light conversion may be performed to convert a wavelength of the light.

Therefore, by mounting the LED chip LC forming the display part 10 on the semiconductor chip SC in which the driver IC circuit or the MCU circuit is formed by a chip scale package (CSP) process, it is possible to implement, for example, a local dimming backlight including a plurality of display color controls or control elements, thereby reducing the wiring length and greatly improving light extraction efficiency.

Further, by minimizing optical distance of the display or the backlight, it is possible to implement a thin display or design an ultra-thin package of a polychromatic or a monochromatic light emitting diode with minimized number of components.

Further, by forming various optical systems such as a light diffusing lens or an optical system of a side reflected light form on a light emitting surface, a light orientation angle can be improved, and a thinner and more uniform surface light source can be implemented with fewer light emitting devices.

Further, by implementing multiple local dimming with same number of local dimming and number of light sources, it is possible to maximize black-white contrast (black contrast) and dramatically reduce difficulties of mounting space constraints, circuit complication, and unit cost increasement when manufacturing a module.

Further, a control element (driving circuit) with a structure that maximizes controlled levels of light brightness can be included to achieve more levels of contrast, and for accurate control, feedback terminals and terminals for multiple functions, power and ground terminals, etc. can be variously configured.

On the other hand, as shown in FIG. 2, a first width W1 of the display part 10 may be substantially equal to a second width W2 of the driving part 20, or a bezel width BW of the display part 10 may be equal to or less than half of a first pitch P1 of the light emitting devices R, G, and B of the display part 10 so that images of each screen displayed in a large screen by being arranged side by side with another driving package with an integrated display 100 can be displayed to be connected as one.

A third width W3 of the terminal part 22 may be substantially equal to the first width W1 or smaller than the first width W1.

Therefore, when the display part 10 of the driving package with the integrated display 100 of the present disclosure and the display part 10 of other neighboring driving package with an integrated display 100 are arranged to be in contact with each other, there may be no bezel width BW at all, or the bezel widths BW on both sides are smaller than the first pitch P1 of the light emitting devices R, G, and B of the display part 10, so images expressed in each display part 10 may be implemented to be a single image.

Figure 4:
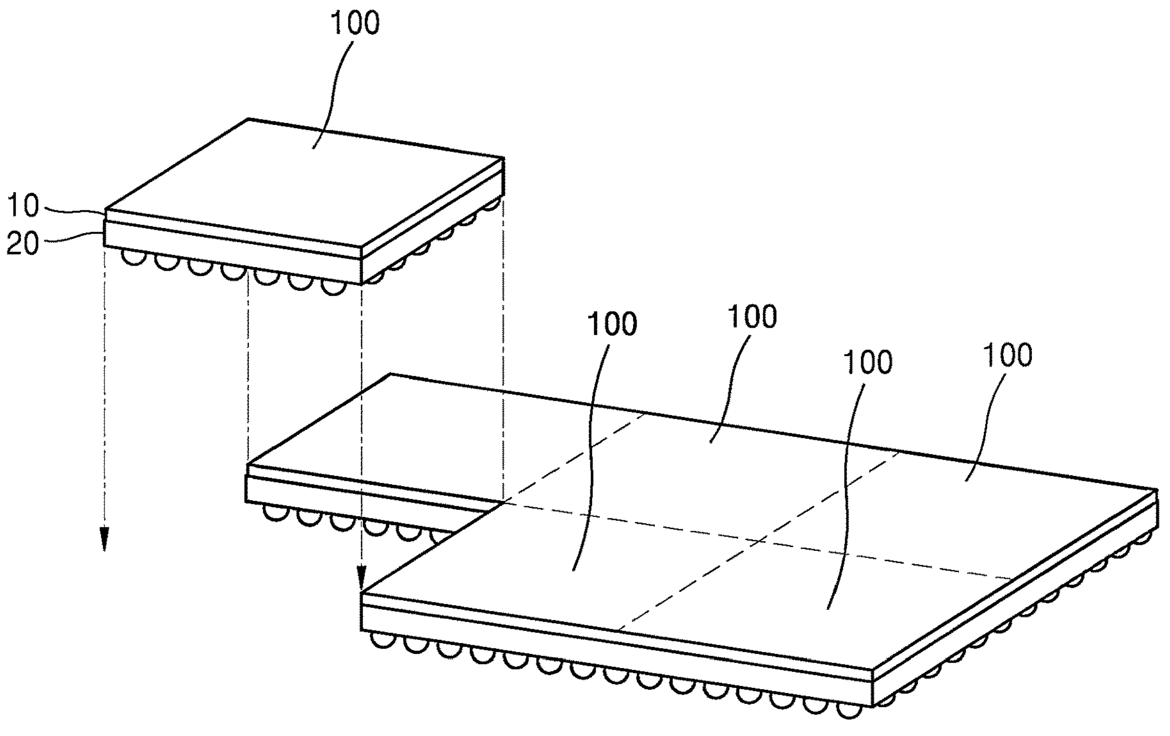
FIG. 4 is a state view of use showing a state in which a large screen is formed by connecting the driving packages with integrated displays of FIG. 1 to each other.

FIG. 4 is a state view of use showing a state in which a large screen is formed by connecting the driving packages with integrated displays 100 of FIG. 1 to each other.

As shown in FIG. 4, the display part 10 and the driving part 20 are integrated into a single package which can be applied not only to small IT devices such as an AR device or a VR device, or a small projector, but also to a wide range of applications such as a laptop, a monitor, a TV, as well as a large-screen display device, a backlight panel, and a lighting device, by connecting a plurality of them to each other in a seamless form without a bezel, which allows an easy enlargement of a screen.

FIGS. 5 to 9 are cross-sectional views showing an example of a manufacturing process of the driving package with the integrated display of FIG. 1 step by step.

Figure 5:
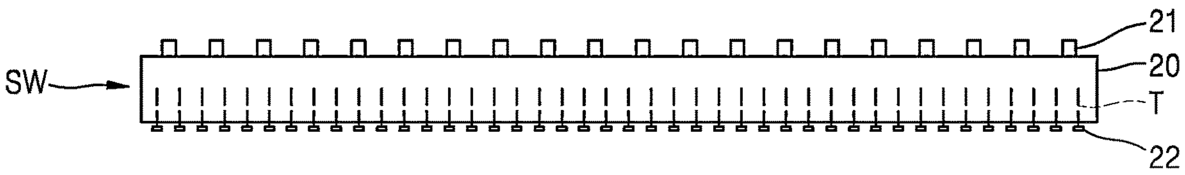
FIGS. 5 to 9 are cross-sectional views showing an example of a manufacturing process of the driving package with the integrated display of FIG. 1 step by step.

As shown in FIGS. 5 to 9, an example of the manufacturing process of the driving package with the integrated display 100 in FIG. 1 will be described step by step. First, as shown in FIG. 5, a wafer for a complementary metal-oxide semiconductor (CMOS) SW in which a driver IC circuit or a MCU (Main Control Unit) circuit is formed may be prepared.

At this time, the wafer for CMOS SW may have a micro bump 21 formed on one side by methods such as electroless plating or electrolytic plating, a terminal part 22 formed on another side by methods such as soldering, and may include a driving part 20 in which a through-substrate via (TSV) T is formed between the micro bump 21 and the terminal part 22.

Figure 6:
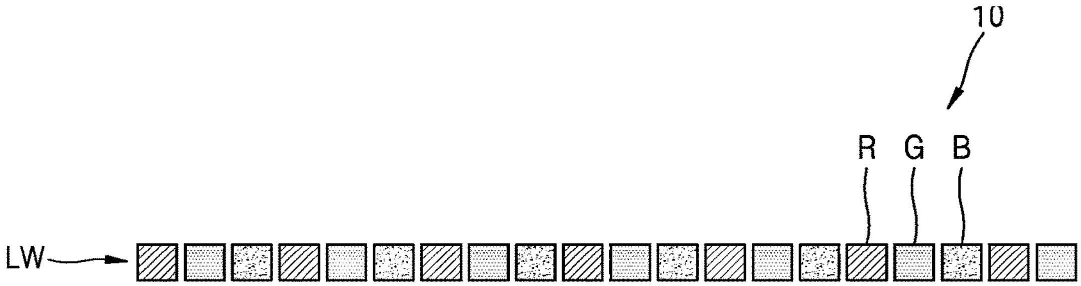

Subsequently, as shown in FIG. 6, a wafer for an LED LW in which micro LEDs or LEDs are formed can be prepared.

At this time, the wafer for an LED LW may include a plurality of light emitting devices R, G, and B such as a micro LED or a mini LED.

Figure 7:
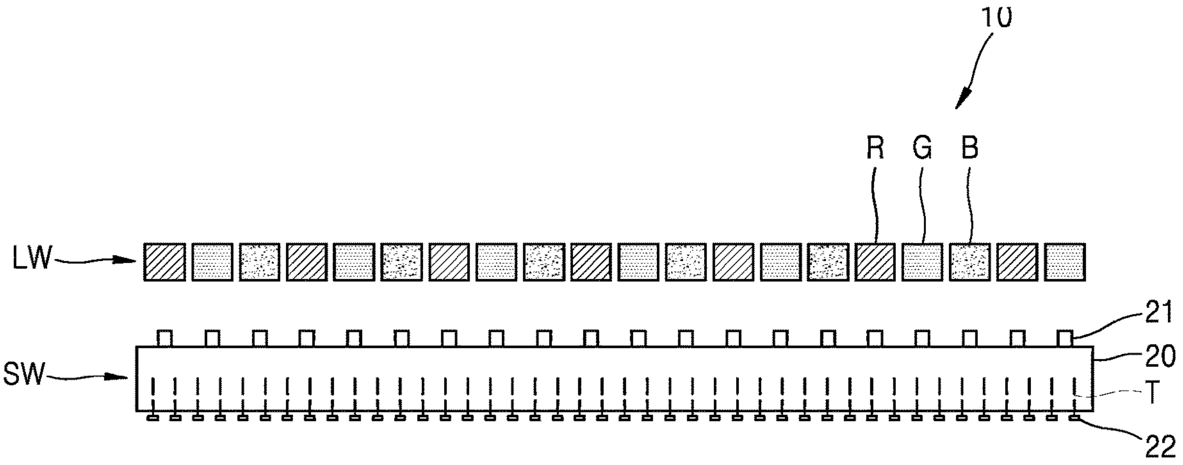
Figure 8:
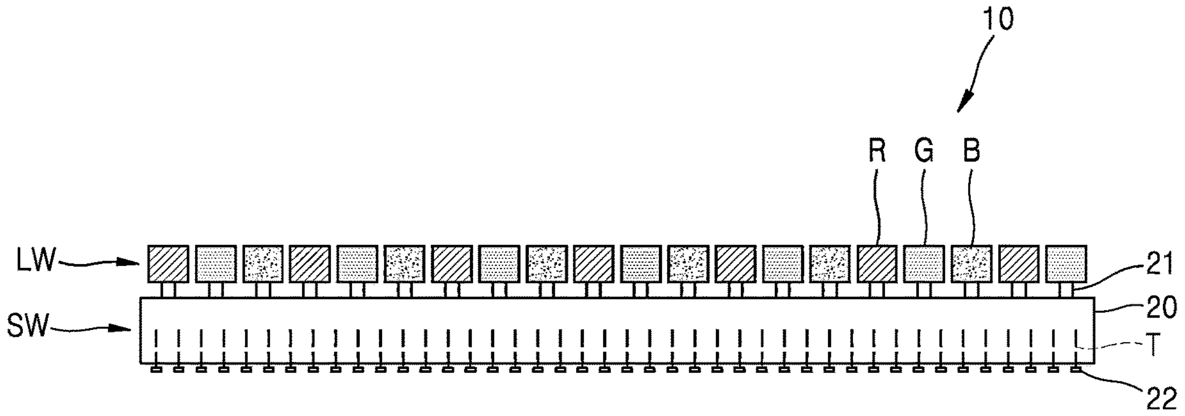

Subsequently, as shown in FIG. 7, the wafer for CMOS SW and the wafer for an LED LW are aligned using a chip pattern, a bump pattern, an alignment mark, etc. in a wafer-to-wafer manner. Then, as shown in FIG. 8, the wafer for CMOS SW and the wafer for an LED LW can be bonded using heating, eutetic, laser bonding, etc. so that the driving part of the wafer for CMOS SW and the display part 10 of the wafer for an LED LW can be electrically connected to each other.

Figure 9:
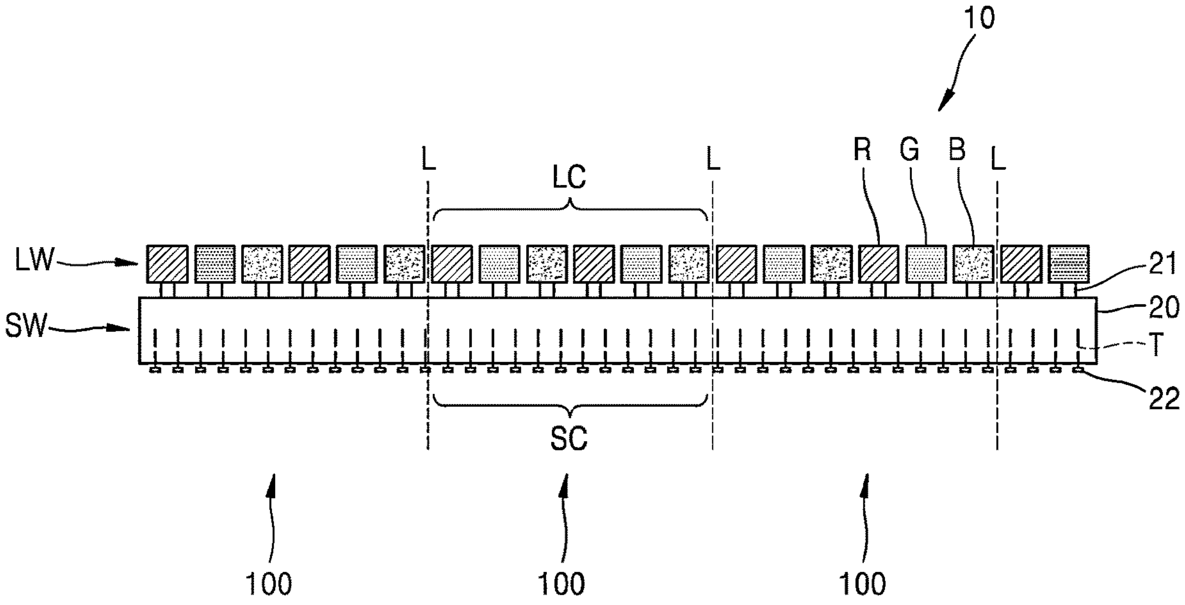

Subsequently, as shown in FIG. 9, the bonded wafer for CMOS SW and wafer for an LED LW can be cut along a cutting line L into a unit package using a blade or laser cutting, etc.

For example, for convenient use and management, the unit packages can be manufactured in sizes from approximately 0.5 inches to 2 inches.

Therefore, by bonding the display part 10 and the driving part 20 in the wafer-to-wafer manner and mounting the plurality of light emitting devices R, G, and B collectively on the driving part 20, productivity can be greatly improved, and manufacturing time and manufacturing cost can be greatly reduced.

FIGS. 10 to 13 are cross-sectional views showing another example of the manufacturing process of the driving package with the integrated display 100 of FIG. 1 step by step.

Figure 10:
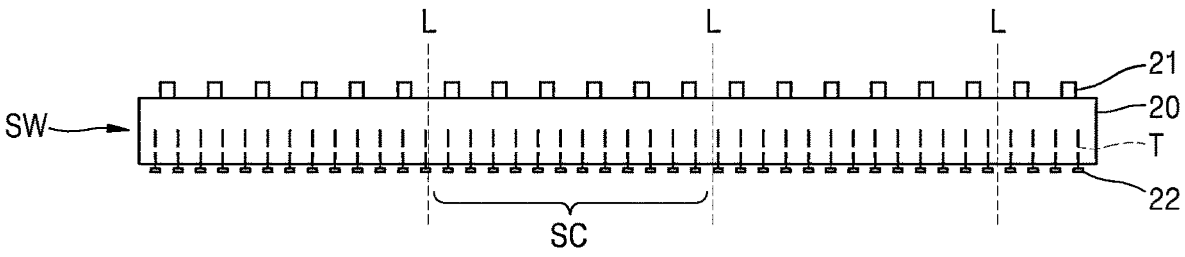
FIGS. 10 to 13 are cross-sectional views showing another example of the manufacturing process of the driving package with the integrated display of FIG. 1 step by step.

As shown in FIGS. 10 to 13, another example of the manufacturing process of the driving package with the integrated display 100 in FIG. 1 will be described step by step. First, as shown in FIG. 10, a wafer for a complementary metal-oxide semiconductor (CMOS) SW in which driver IC circuit or a MCU (Main Control Unit) circuit is formed can be cut along a cutting line L using a blade or laser cutting into a semiconductor chip SC form.

At this time, the wafer for CMOS SW may have a micro bump 21 formed on one side by methods such as electroless plating or electrolytic plating and a terminal part 22 formed on another side by methods such as soldering, and may include a driving part 20 in which a through-substrate via (TSV) T is formed between the micro bump 21 and the terminal part 22.

Figure 11:
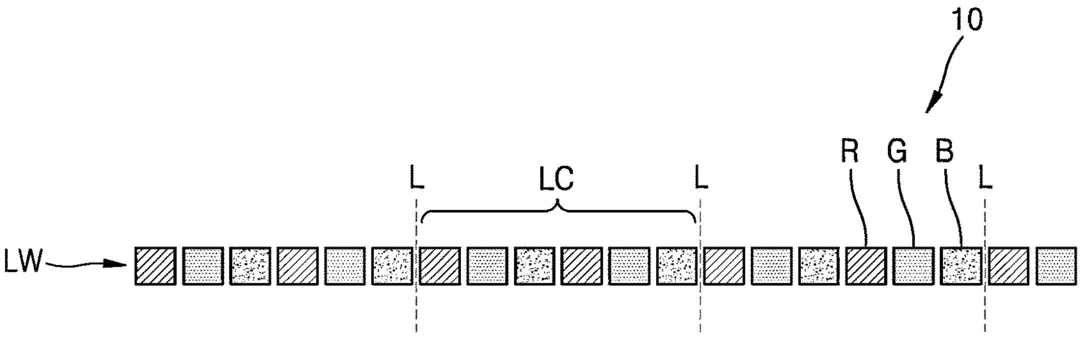

Subsequently, as shown in FIG. 11, a wafer for an LED LW in which a micro LED or an LED is formed can be cut along a cutting line L using a blade or laser cutting into an LED chip LC form.

At this time, the wafer for an LED LW may include a plurality of light emitting devices R, G, and B such as a micro LED or a mini LED.

Figure 12:
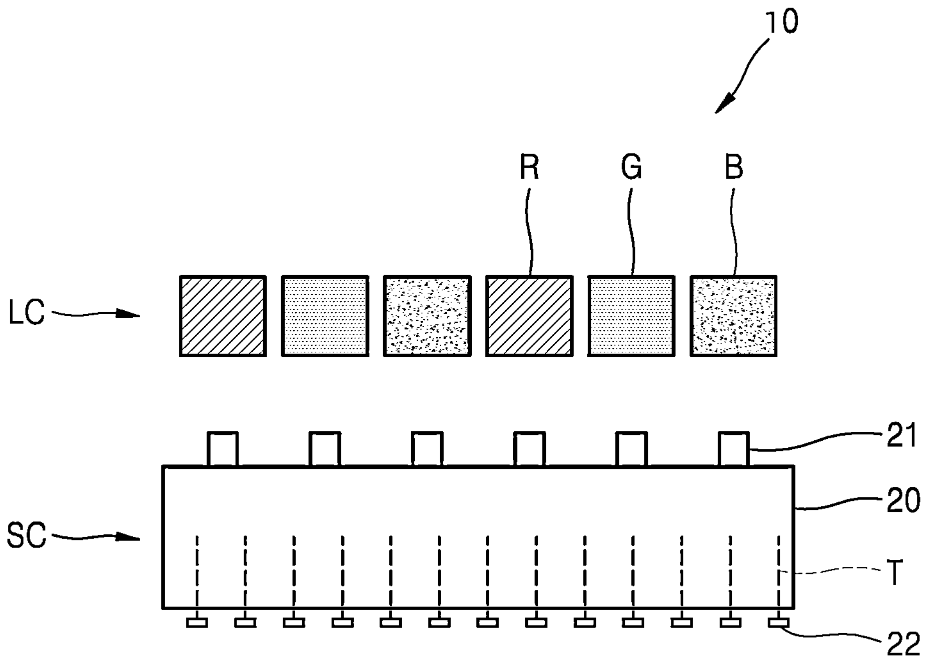
Figure 13:
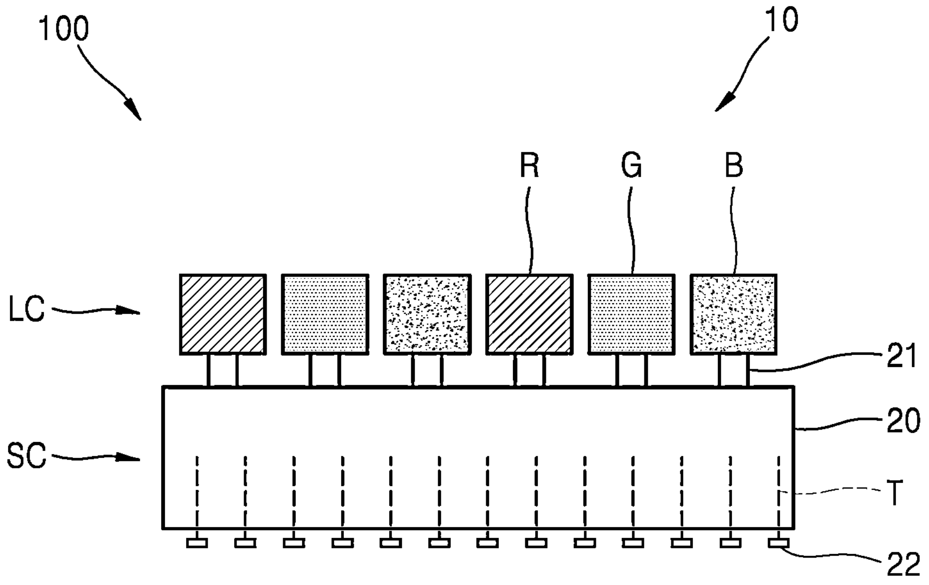

Subsequently, as shown in FIG. 12, the cut semiconductor chip SC and the cut LED chip LC are aligned using a chip pattern, a bump pattern, an alignment mark, etc. in a chip-to-chip manner. Then, as shown in FIG. 13, the cut semiconductor chip SC and the cut LED chip LC can be bonded so that the cut semiconductor chip SC and the cut LED chip LC can be electrically connected to each other.

Therefore, by bonding the display part 10 and the driving part 20 in the chip-to-chip manner and mounting the plurality of light emitting devices R, G, and B collectively on the driving part 20, productivity can be greatly improved, and manufacturing time and manufacturing cost can be greatly reduced.

However, the manufacturing methods of the driving package with the integrated display 100 according to various embodiments of the present disclosure are not necessarily limited thereto, and a wide variety of forms and types of manufacturing methods may be applied.

Figure 14:
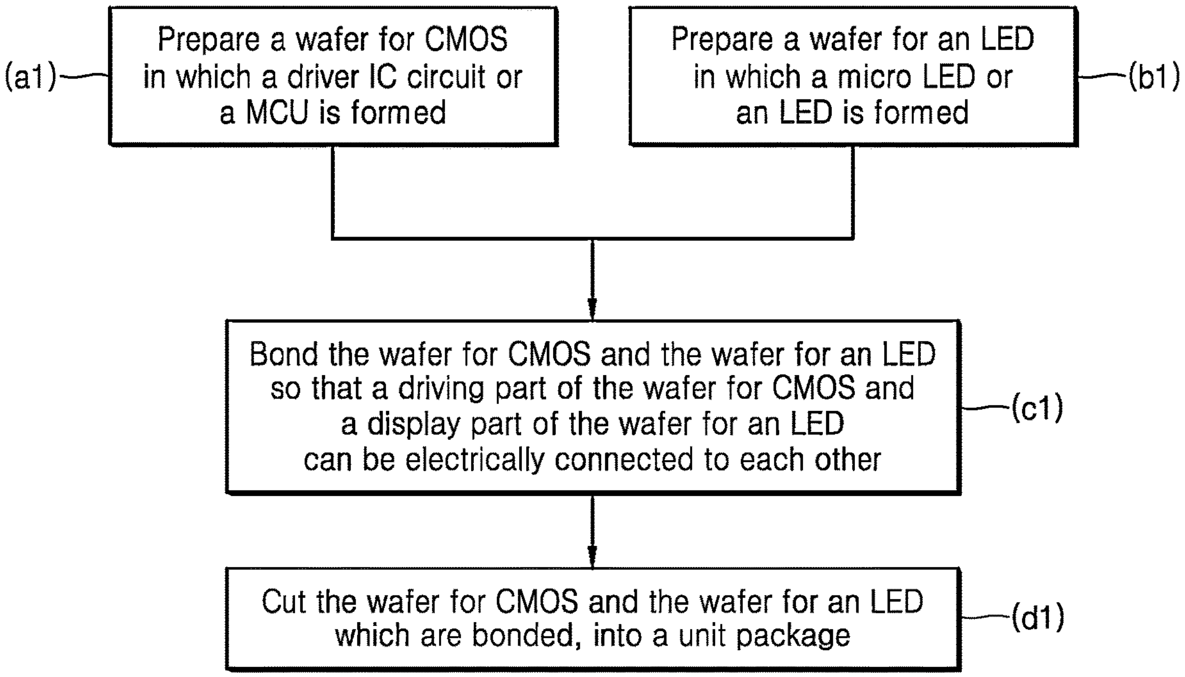
FIG. 14 is a flow chart showing a manufacturing method of a driving package with an integrated display according to some embodiments of the present disclosure.

FIG. 14 is a flow chart showing a manufacturing method of a driving package with an integrated display 100 according to some embodiments of the present disclosure.

As shown in FIGS. 1 to 14, the manufacturing method of the driving package with an integrated display 100 according to some embodiments of the present disclosure may include a step a1 of preparing a wafer for a complementary metal-oxide semiconductor (CMOS) SW in which a driver IC circuit or a main control unit (MCU) circuit is formed, a step b1 of preparing a wafer for an LED LW in which a micro LED or an LED is formed, a step c1 of bonding the wafer for CMOS SW and the wafer for an LED LW so that a driving part of the wafer for CMOS SW and a display part 10 of the wafer for an LED LW can be electrically connected to each other, and a step d1 of cutting the wafer for CMOS SW and the wafer for an LED LW which are bonded, along a cutting line L into a unit package.

Figure 15:
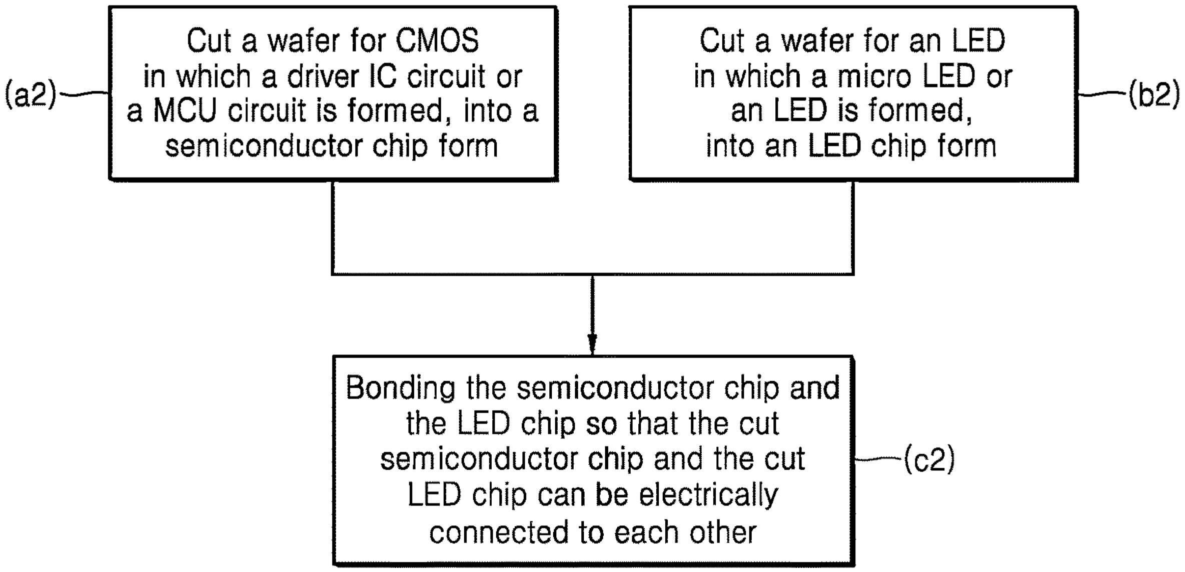
FIG. 15 is a flow chart showing a manufacturing method of a driving package with an integrated display according to some other embodiments of the present disclosure.

FIG. 15 is a flow chart showing a manufacturing method of a driving package with an integrated display 100 according to some other embodiments of the present disclosure.

As shown in FIGS. 1 to 15, the manufacturing method of the driving package with the integrated display 100 according to some other embodiments of the present disclosure may include a step a2 of cutting a wafer for a complementary metal-oxide semiconductor (CMOS) SW in which a driver IC circuit or a main control unit (MCU) circuit is formed, along a cutting line L into a semiconductor chip SC form, a step b2 of cutting a wafer for an LED LW in which a micro LED or an LED is formed, along a cutting line L into an LED chip LC form, and a step c2 of bonding the semiconductor chip SC and the LED chip LC so that the cut semiconductor chip SC and the cut LED chip LC can be electrically connected to each other.

The present disclosure has been described with reference to the embodiments illustrated in the drawings, but these embodiments are merely illustrative and it should be understood by a person with ordinary skill in the art that various modifications and equivalent embodiments can be made without departing from the scope of the present disclosure. Therefore, the true technical protective scope of the present disclosure should be determined based on the technical concept of the appended claims.

REFERENCE SIGNS LIST

10: Display part
R, G, B: Light emitting device
LW: Wafer for an LED
LC: LED chip
20: Driving part
21: Micro bump
22: Terminal part
SW: Wafer for CMOS
SC: Semiconductor chip
T: TSV
S: External substrate
W1: First width
W2: Second width
BW: Bezel width
P1: First pitch
W3: Third width
L: Cutting line
100: Driving package with an integrated display

What is claimed is:

1. A driving package with an integrated display comprising:

a display part comprising a plurality of light emitting devices forming a plurality of pixels so that an entire screen or a portion of the screen is displayed; and a driving part in which the display part is formed on one side and a terminal part is formed on another side, driving the light emitting devices, wherein a first width of the display part is substantially equal to a second width of the driving part, or a bezel width of the display part is equal to or less than half of a first pitch of the light emitting devices of the display part, so that images of each screen displayed in a large screen is displayed to be connected as one when the driving package, wherein the display part and the driving part is integrated, is arranged side by side with another driving package, wherein another display part and another driving part is integrated, wherein the driving part is in a form of a semiconductor chip formed by cutting a wafer for a complementary metal-oxide semiconductor (CMOS) in which a driver IC circuit or a main control unit (MCU) circuit is formed to control the display part, wherein the display part is provided in a form of an LED chip formed by cutting a wafer for an LED in which a micro LED or an LED is formed so that mono colors or RGB colors can be implemented, wherein the display part and the driving part is integrated by bonding the semiconductor chip of the driving part and the LED chip of the display part so that the semiconductor chip and the LED chip can be electrically connected to each other.

2. The driving package with the integrated display of claim 1, wherein, in the driving part, at least one micro bump is formed on one side to be able to be electrically connected to each of the light emitting devices.

3. The driving package with the integrated display of claim 2, wherein, in the driving part, at least one through-substrate via (TSV) is formed between the micro bump and the terminal part.

4. The driving package with the integrated display of claim 1, wherein the terminal part comprises at least any one of a ball grid array, a pad, or a lead frame to be electrically connected to an external substrate.

5. The driving package with the integrated display of claim 1, wherein a third width of the terminal part is substantially equal to the first width or smaller than the first width.

* * * * *